(12) United States Patent
Schlager et al.

(10) Patent No.: US 12,244,363 B1
(45) Date of Patent: Mar. 4, 2025

(54) TAG WITH ADVANCED CLOCK EXTRACTION

(71) Applicant: Renesas Design Austria GmbH, Graz (AT)

(72) Inventors: Tobias Schlager, Graz (AT); Richard Sbuell, Graz (AT)

(73) Assignee: Renesas Design Austria GmbH, Graz (AT)

( * ) Notice: Subject to any disclaimer, the term of this patent is extended or adjusted under 35 U.S.C. 154(b) by 0 days.

(21) Appl. No.: 18/749,101

(22) Filed: Jun. 20, 2024

(30) Foreign Application Priority Data

Nov. 27, 2023 (EP) ..................................... 23212344

(51) Int. Cl.
    *H04B 5/48*     (2024.01)
    *H04B 5/40*     (2024.01)

(52) U.S. Cl.
    CPC ..................................... *H04B 5/40* (2024.01)

(58) Field of Classification Search
    CPC ................................... H04B 5/40; H04B 5/48
    See application file for complete search history.

(56) References Cited

U.S. PATENT DOCUMENTS 10,505,396 B2 * 12/2019 Iwasaki ................... H02J 50/80
10,846,582 B2    11/2020 Dalwadi
11,108,537 B1 *  8/2021 Metawea ................ H04L 27/02

FOREIGN PATENT DOCUMENTS

WO     2023/060090 A1     4/2023

OTHER PUBLICATIONS

Extended European Search Report, mailed Apr. 25, 2024, from European Patent Serial No. EP23212344.8, 5 pages.

* cited by examiner

Primary Examiner — Tuan H Nguyen
(74) Attorney, Agent, or Firm — Workman Nydegger

(57) ABSTRACT

A receiver exposed to a magnetic field with a specified carrier frequency in the RF frequency area and configured to extract an internal clock signal for processing of data with a receiver IC. The receiver includes an antenna configured to receive an antenna signal and a tuning circuit and configured to provide a first received signal at a first pin of the receiver IC and a second receiver signal at a second pin of the receiver IC. The receiver IC includes a harvesting stage configured to rectify a differential received signal provided between the first pin and the second pin of the receiver IC and configured to provide a supply voltage referenced to a ground potential for the receiver IC, and a clock extraction stage configured to provide a first threshold level to switch the internal clock signal with a rectangular signal shape between high and low potential.

8 Claims, 4 Drawing Sheets

TAG WITH ADVANCED CLOCK EXTRACTION

FIELD OF THE INVENTION

The present invention relates to a receiver exposed to a magnetic field with a specified carrier frequency in the RF frequency area and built to extract an internal clock signal for processing of data with a receiver IC of the receiver, which receiver comprises: an antenna built to receive an antenna signal and a tuning circuit and built to provide a first received signal at a first pin of the receiver IC and a second receiver signal at a second pin of the receiver IC, which receiver IC comprises:

a harvesting stage built to rectify a differential received signal provided between the first pin and the second pin of the receiver IC and built to provide a supply voltage referenced to a ground potential for the receiver IC;

a clock extraction stage built to provide a first threshold level to switch the internal clock signal with a rectangular signal shape between high and low potential.

BACKGROUND OF THE INVENTION

Known Radio Frequency IDentification communication systems use integrated circuits like ST25R3916 in RFID readers or transmitters to communicate with active or passive receivers. In a typical application, a passive receiver (e.g. transponder or tag) stores object identification information of an object to which it is attached and the transmitter (e.g. reader) is used to obtain this object information. The transmitter is powered and generates a magnetic RF-Field emitted by its antenna. When the transmitter and the tag are within close proximity of each other, the transmitter generated RF-Field is induced into the antenna of the tag and used to power the passive tag. The tag also has a transceiver to receive the signal from the reader and to transmit a response back to the transmitter as load modulated receiver data signal.

There are standards like ISO/IEC18000-3 or ISO/IEC 14.443 Type A and B or ISO15.693 or ECMA-340 13.56 MHz Near Field Communication (NFC) or the NFC Forum or company standards like Felica from company Sony that define protocols and types of modulation used to transmit information between the tag and the reader. Some or all of these standards define to use an amplitude modulation to transmit an amplitude modulated data signal with digital data within the RF-Field over the air to the tag. ISO14.443 Type A for instance furthermore defines to use a modified Miller encoding to encode the data signal into an encoded data signal for the transmission.

FIG. 1 discloses a system 1 of a reader 2 and a passive tag 3 according to the state of the art in a symbolic way reduced to those stages that are relevant for the invention. Reader 2 comprises a reader IC 4, that processes communication data and that is connected to a tuning circuit 5 and an antenna 6 to emit a magnetic field with a NFC (Near Field Communication) resonance frequency $f_{res}$ of 13.56 MHz. Tag 3 is a receiver exposed to the magnetic field of the reader 2 and is built to extract an internal clock signal CLK for processing of communication data with a receiver IC 7 of tag 3. Tag 3 furthermore comprises an antenna 8 built to receive and provide an antenna signal AS at two antenna connections to a tuning circuit 9, which is dimensioned to receive the antenna AS in resonance to provide a first received signal RS1 at a first pin 10 of the receiver IC 7 and a second receiver signal RS2 at a second pin 11 of the receiver IC 7. While the other connections in FIG. 1 are only shown symbolically with one line, the connection from tuning circuit 8 to receiver IC 7 are shown as two separate connections to explain the processing of the receiver signals RS for the generation of an internal supply voltage VDD and the internal clock signal CLK in detail.

Receiver IC 7 comprises a harvesting stage 12 built to rectify a differential received signal $U_{DIF}$ ($U_{DIF}=U_{RS1}-U_{RS2}$) provided between the first pin 10 and the second pin 11 of the receiver IC 7 and shown in the upper time diagram of FIG. 2. Harvesting stage 12 comprises a full wave rectifier 13 and an amplifier 14 and is built to provide the supply voltage VDD referenced to a ground potential GND for the receiver IC 7. The supply voltage VDD may be fixed at 5V or 3V, just to give two examples.

Receiver IC 7 furthermore comprises a data processor stage 15 that is supplied with the supply voltage VDD and the internal clock signal CLK and connected to first pin 10, to receive the first received signal RS1, and connected to second pin 11, to receive the second received signal RS2. Data processing stage 15 is built to demodulate data received from reader 2 in the magnetic field and built to process these received data and modulate the magnetic field with load modulation to communicate data back to the reader 2.

Receiver IC7 furthermore comprises a clock extraction stage 16 and a PLL (Phase Lock Loop) stage 17 according to the state of the art. The clock extraction stage 16 is built to store and provide and use a first threshold level TH to switch the internal clock signal CLK, which has a rectangular signal shape, between high potential (e.g. 1.5V) and low potential (e.g. 0V). In the middle time diagram of FIG. 2, the voltage $U_{RS1}$ of the first received signal RS1 referenced to ground potential GRD and the voltage $U_{RS2}$ of the second received signal RS2 referenced to ground potential GRD are shown. Clock extraction stage 16 is built to use voltage $U_{RS1}$ of the first received signal RS1 to switch the internal clock signal CLK shown in the lower time diagram of FIG. 2. Other prior art art clock extraction stages are known that use the voltage $U_{RS2}$ of the second received signal RS2 with the first threshold level TH to switch the internal clock signal CLK. But always only one of the two voltages $U_{RS1}$ and $U_{RS2}$ is used.

This state of the art receiver 3 with clock extraction stage 16 comprises the disadvantage that it is not robust against any kind of antenna signal AS distortions, which as one example result in the first received signal RS1 and the second received signal RS2 and the differential received signal $U_{DIF}$ shown in FIG. 3. These distortions may happen due to the interaction of the tuning circuit 9 with the full wave rectifier 13 or may occur if antenna 8 is exposed to a weak magnetic field, when there is poor coupling between the antenna 6 of reader 2 and the antenna 8 of tag 3. The distortions of the voltage $U_{RS1}$ of the first received signal RS1, as shown in the middle time diagram of FIG. 3, lead to a second pulse, which causes two short internal clock signal CLK pulses as shown in the lower time diagram of FIG. 3. Furthermore, the time periods of high potential and low potential of the internal clock signal CLK provided by clock extraction stage 16 are different. PLL stage 17 will not be able to lock into such a signal provided by clock extraction stage 16. As a result, data processing stage 15 will not be able to process data in a correct and/or timely manner with such an internal clock signal CLK.

SUMMARY OF THE INVENTION

It is an object of the invention to provide a receiver with a clock extraction stage that provides a robust and stable internal clock signal, even in case of distortions of the received antenna signal. This object is achieved with a receiver that furthermore comprises a clock extraction stage as claimed in claim 1.

The inventive clock extraction stage uses both, the first received signal and the second received signal, and defines three threshold levels to enable a robust extraction of the internal clock signal. Only a logic combination of two of the three threshold levels ensures a save criteria to set the internal clock signal (switch from low to high potential) and to reset the internal clock signal (switch from high to low potential). Details of this logic combination will be explained in the description of the embodiments shown in the figures.

It is furthermore advantageous and in some realizations even necessary to adapt two of the three threshold levels with a threshold adaption circuit to take the changing peak amplitude of the received signals of a distorted antenna signal into account. A specific time constant is used to continuously trace two of the three thresholds.

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 4:
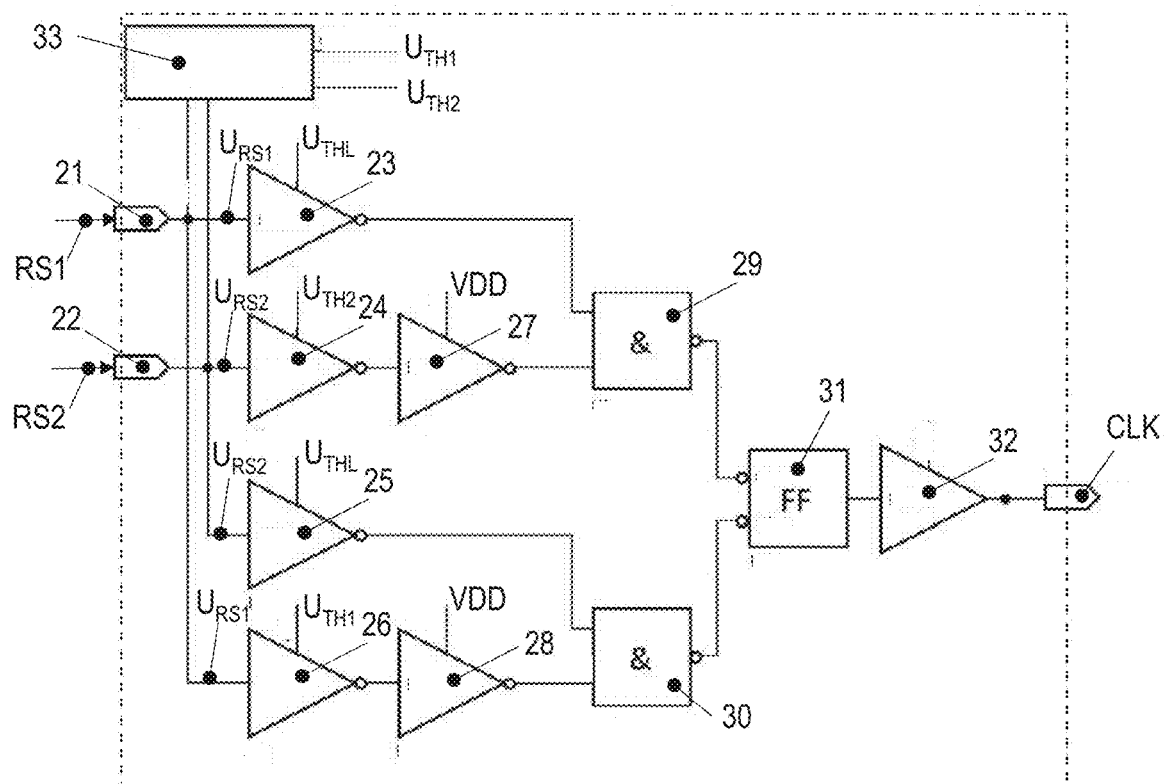
FIG. 4 shows an embodiment of a receiver IC of a clock extraction stage according to the invention.

FIG. 4 shows a clock extraction stage 18 of a receiver 19 exposed to a magnetic field with a specified carrier frequency in the RF frequency area and built to extract an internal clock signal CLK for processing of data with a receiver IC 20 of the receiver 19. Reference is made to the explanation of the state of the art receiver 3 in FIG. 1, because reference numbers of all circuits and stages disclosed and explained there, that have the same technical function, will be used in the description of the inventive receiver 19. The inventive receiver 19 differs from the state of the art receiver 3 in the concept of the clock extraction stage 18 shown in FIG. 4 and that the clock extraction stage 18 comprises a first input pin 21, connected to the first pin 10 of receiver IC 20, and comprises a second input pin 22, connected to the second input pin 11 of receiver IC 20.

Clock extraction stage 18 is built to provide a first threshold level TH1 to switch the internal clock signal CLK with a rectangular signal shape between high and low potential to set and reset the internal clock signal CLK. Clock extraction stage 18 is furthermore built to provide a second threshold level TH2 and to provide a low threshold level THL, which low threshold level THL is closer to ground potential GRD than the first threshold level TH1 and the second threshold level TH2. The clock extraction stage 18 is built to switch the internal clock signal CLK from low potential to high potential (set CLK), if the voltage $U_{RS1}$ of the first received signal RS1 referenced to ground potential GRD is above or passes above the first threshold level TH1 and the voltage $U_{RS2}$ of the second received signal RS2 referenced to ground potential GRD is below or passes below the low threshold level THL. The clock extraction stage is furthermore built to switch the internal clock signal CLK from high potential to low potential (reset CLK), if the voltage $U_{RS1}$ of the first received signal RS1 referenced to ground potential GRD is below or passes below the low threshold level THL and the voltage $U_{RS2}$ of the second received signal RS2 referenced to ground potential GRD is above or passes above the second threshold level TH2. Above described logic to set and reset the internal clock signal CLK is shown in below table:

| Condition | Internal Clock Signal CLK |
|---|---|
| $(U_{RS1} > U_{TH1})$ AND $(U_{RS2} < U_{THL})$ | SET |
| $(U_{RS2} > U_{TH2})$ AND $(U_{RS1} < U_{THL})$ | RESET |

FIG. 4 shows one concrete implementation to realize this logic to set and reset the internal clock signal CLK with six inverters 23 to 28 and two NAND gates 29 and 30 and a flip flop 31 and a buffer 32. The function of this implementation will explained based on the first received signal RS1 and the second received signal RS2 and the therefrom extracted internal clock signal CLK shown in FIG. 5.

Figure 5:
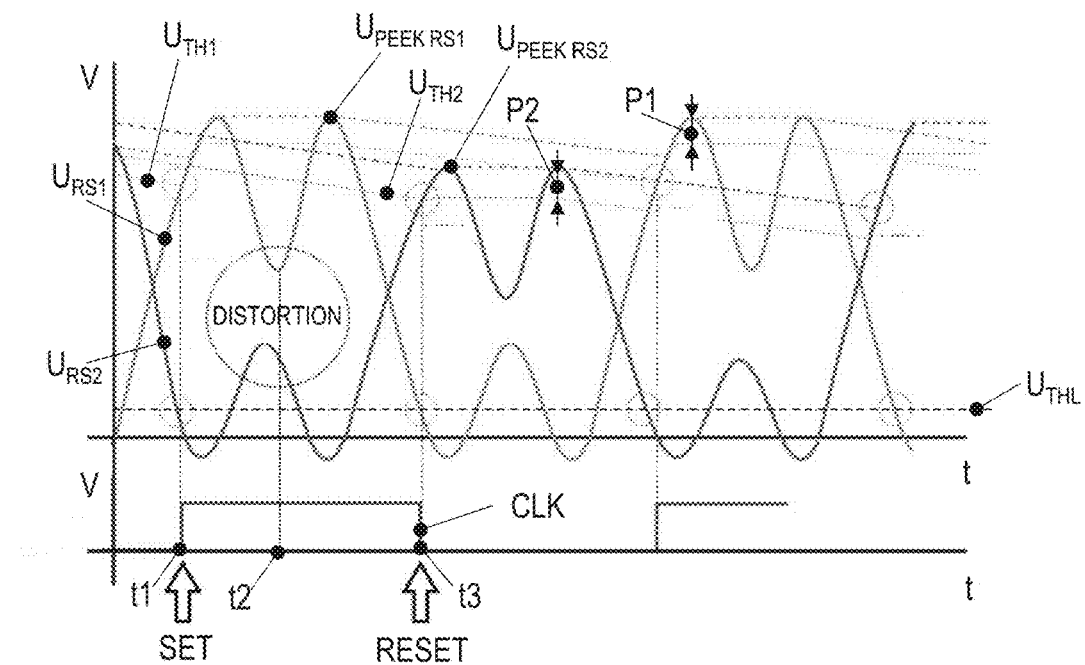
FIG. 5 shows example signals how the clock extraction stage of FIG. 4 sets and resets the internal clock signal.

Clock extraction stage 18 furthermore comprises a threshold adaption circuit 33 built to adapt the first threshold level TH1, if a peak voltage $U_{PEEK\_RS1}$ of the first received signal RS1 changes over time, and/or built to adapt the second threshold level TH2, if a peak voltage $U_{PEEK\_RS2}$ of the second received signal RS2 changes over time. The actual peak voltage $U_{PEEK}$ of these received signal RS is the highest peak of the amplitude during the past periods of the received signal RS as can be seen in FIG. 5.

To adapt the first threshold level TH1 the threshold adaption circuit 33 is built to increase a voltage $U_{TH1}$ of the first threshold level TH1 to a fixed first voltage P1 below the actual peak voltage $U_{PEEK\_RS1}$ of the first received signal RS1, if the actual peak voltage $U_{PEEK\_RS1}$ of the first received signal RS1 is higher than the actual voltage $U_{TH1}$ of the first threshold level TH1 plus the fixed first voltage P1. The fixed first voltage P1 and/or the fixed second voltage P2 for instance may be 0.1V or 0.3V or 0.5V or 0.75V or 1V and ensures that a voltage $U_{TH1}$ of the first threshold level TH1 is below the peak voltage $U_{PEEK\_RS1}$ of the first received signal RS1 and that the voltage $U_{TH2}$ of the second threshold level TH2 is below the peak voltage $U_{PEEK\_RS2}$ of the second received signal RS2 as can be seen in FIG. 5. This mechanism to increase the voltage $U_{TH1}$ of the first threshold level TH1 is shown in FIG. 5 where the dashed line of the continuously adopted voltage $U_{TH1}$ of the first threshold level TH1 runs with the distance of the fixed first voltage P1 parallel to a dashed line that starts from the peak voltage $U_{PEEK\_RS1}$ and decreases from there until it is increased again. In the same way the threshold adaption circuit 33 is built to increase a voltage $U_{TH2}$ of the second threshold level TH2 a fixed second voltage P2 below an actual peak voltage $U_{PEEK\_RS2}$ of the second received signal RS2, if the actual peak voltage $U_{PEEK\_RS2}$ of the second received signal RS2 is higher than the actual voltage $U_{TH2}$ of the second threshold level TH2 plus the fixed second voltage P2. This mechanism ensures that first threshold level TH1 and the second threshold level TH2 are increased if the magnetic field gets stronger with larger amplitudes of the first received signal RS1 and the second received signal RS2.

Threshold adaption circuit 33 furthermore is built to continuously reduce the first threshold level TH1 and the second threshold level TH2 based on a time constant. The time constant may be realized with a RC stage in threshold adaption circuit 33 for each threshold level where the peak voltage $U_{PEEK\_RS}$ is used to load a capacitor that is unloaded over an ohmic resistance over time. FIG. 5 shows this unloading which reduces and thereby adopts a voltage $U_{TH1}$ of the first threshold level TH1 and adopts a voltage $U_{TH2}$ of the second threshold level TH2. This ensures that first threshold level TH1 and the second threshold level TH2 are reduced over time if the magnetic field gets weaker with smaller amplitudes of the first received signal RS1 and the second received signal RS2. The time constant for the continuous reduction of the threshold levels has to be chosen based on the clock frequency of the internal clock signal CLK and how fast the threshold level should react on changes of the peak amplitude/voltage of the received signals RS1 and RS2.

The function of the implementation of clock extraction stage 18 will now be explained. The first received signal RS1 is input to the clock extraction stage 18 at the first input pin 21 and provided to inverter 23 and inverter 26 and threshold adaption circuit 33. The second received signal RS2 is input to the clock extraction stage 18 at the second input pin 22 and provided to inverter 24 and inverter 25 and threshold adaption circuit 33. Threshold adaption circuit 33 evaluates voltage $U_{TH1}$ of the first threshold level TH1 and voltage $U_{TH2}$ of the second threshold level TH2 as explained above with continuously increasing and decreasing voltages as shown in FIG. 5. Inverter 25 and inverter 26 realize together with NAND gate 30 the logic equation $(U_{RS1}>U_{TH1})$ AND $(U_{RS2}<U_{THL})$ of above table to set the internal clock signal CLK. Furthermore inverter 23 and inverter 24 realize together with NAND gate 29 the logic equation $(U_{RS2}>U_{TH2})$ AND $(U_{RS1}<U_{THL})$ of above table to reset the internal clock signal CLK. Inverters 27 and 28 supplied with VDD convert the output voltage level of inverters 24 and 26, that depend on the changing voltages $U_{TH1}$ and $U_{TH2}$ of the threshold levels TH1 and TH2, to the voltage of logic levels used in the clock extraction circuit 18. The set and reset output voltages of NAND gates 29 and 30 are used to set or reset flip flop 31 and buffer 32 amplifies the current output level of flip flop 31 to provide internal clock signal CLK at an output pin of clock extraction stage 18.

FIG. 5 shows how this implementation of clock extraction stage 18 sets and resets the internal clock signal CLK. At time instance t1 the condition $(U_{RS1}>U_{TH1})$ AND $(U_{RS2}<U_{THL})$ is met and internal clock signal CLK is set. At time instance t2 the first receiver signal RS1 and the second receiver signal RS2 have a distortion, but none of the conditions to set or reset the internal clock signal CLK is given, what enables a robust internal clock signal CLK. At time instance t3 the condition $(U_{RS2}>U_{TH2})$ AND $(U_{RS1}<U_{THL})$ is met and internal clock signal CLK is reset.

Figure 6:
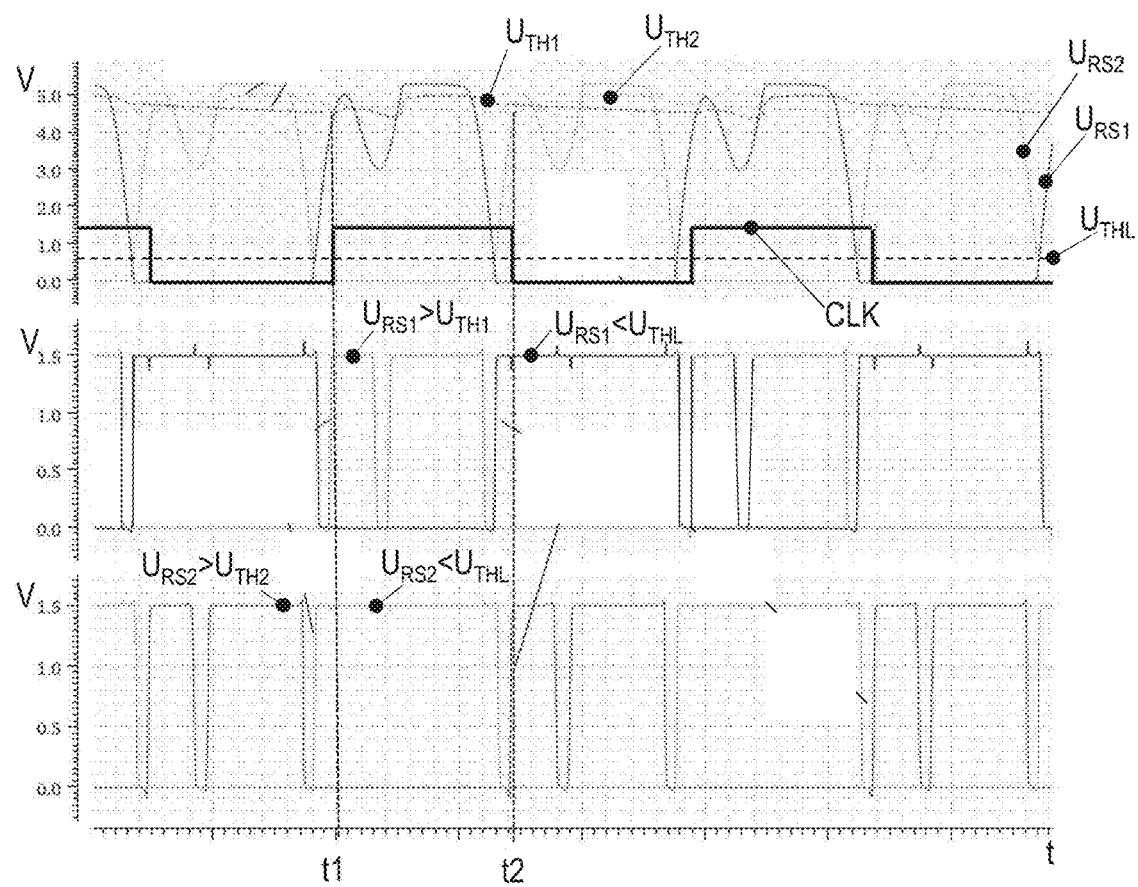
FIG. 6 shows signals of a first computer simulation how the clock extraction circuit of FIG. 4 sets and resets the internal clock signal even with distorted received antenna signals.

FIG. 6 shows signals of a first computer simulation how the clock extraction circuit 18 of FIG. 4 sets and resets the internal clock signal CLK even with a distorted first received signal RS1 and a distorted second received signal RS2. The upper time diagram of FIG. 6 shows the voltage $U_{RS1}$ of the first received signal RS1 and the voltage $U_{RS2}$ of the second received signal RS2, which signals are both distorted, and upper time diagram of FIG. 6 shows the internal clock signal CLK extracted by the clock extraction circuit 18. The middle and lower part of the time diagram of FIG. 6 show the input signals of NAND gates 29 and 30 with the logic equations $(U_{RS1}>U_{TH1})$ and $(U_{RS2}<U_{THL})$ and $(U_{RS2}>U_{TH2})$ and $(U_{RS1}<U_{THL})$ that are used to set or reset the internal clock signal CLK. At time instance t1 the condition $(U_{RS1}>U_{TH1})$ AND $(U_{RS2}<U_{THL})$ is met and internal clock signal CLK is set. At time instance t2 the condition $(U_{RS2}>U_{TH2})$ AND $(U_{RS1}<U_{THL})$ is met and internal clock signal CLK is reset. As can be seen in FIG. 6, there are several distortions of voltages $U_{RS1}$ and $U_{RS2}$ of the received signals RS1 and RS2, but the internal clock signal CLK is stable and comprises a high quality.

Figure 1:
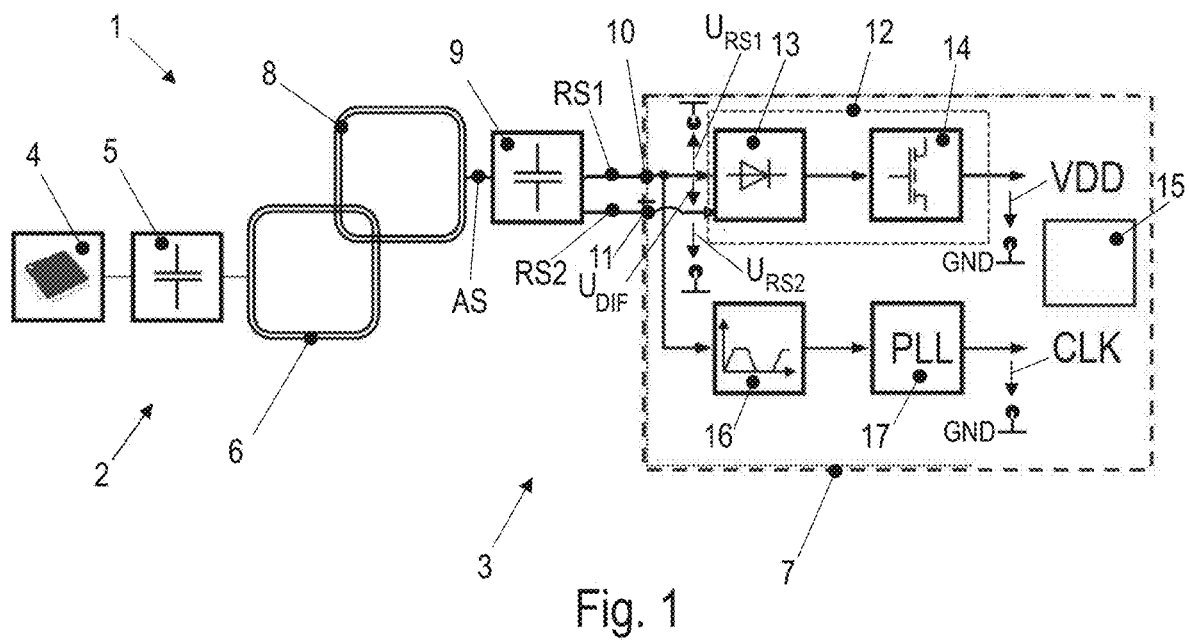
FIG. 1 shows a receiver with a clock extraction stage according to the state of the art.
Figure 2:
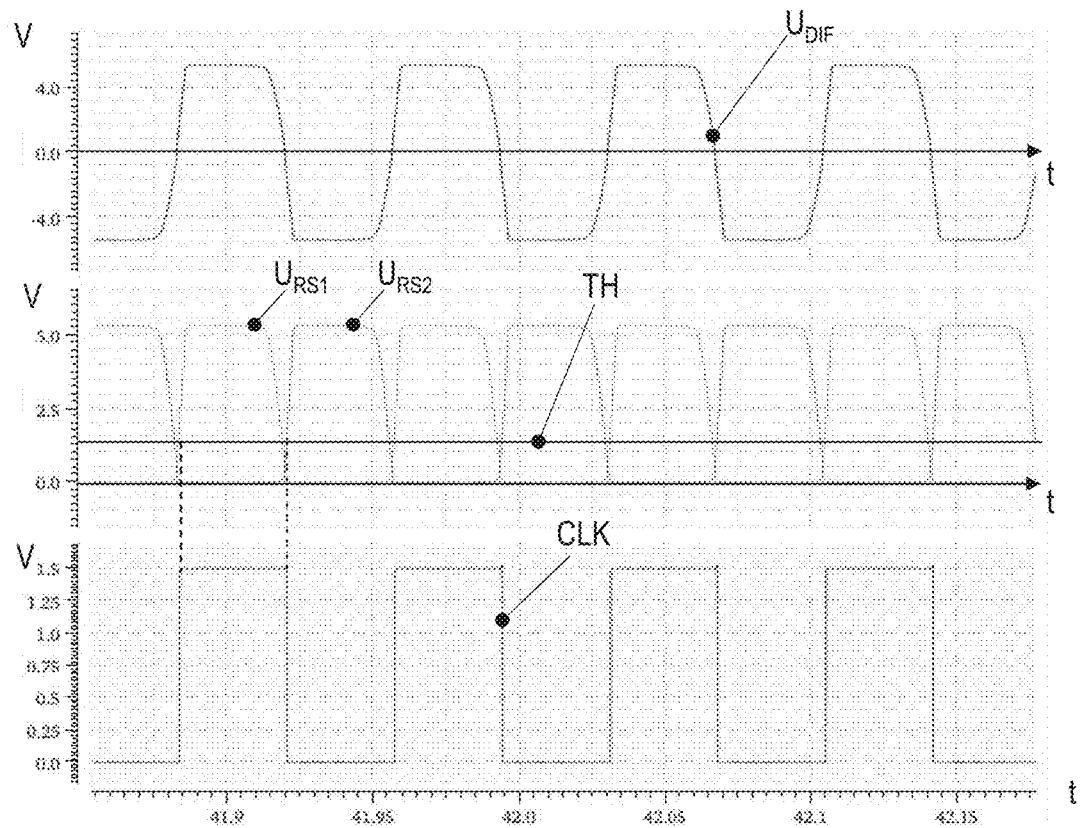
FIG. 2 shows good quality received signals and the internal clock signal extracted with the state of the art clock extraction stage of FIG. 1.
Figure 3:
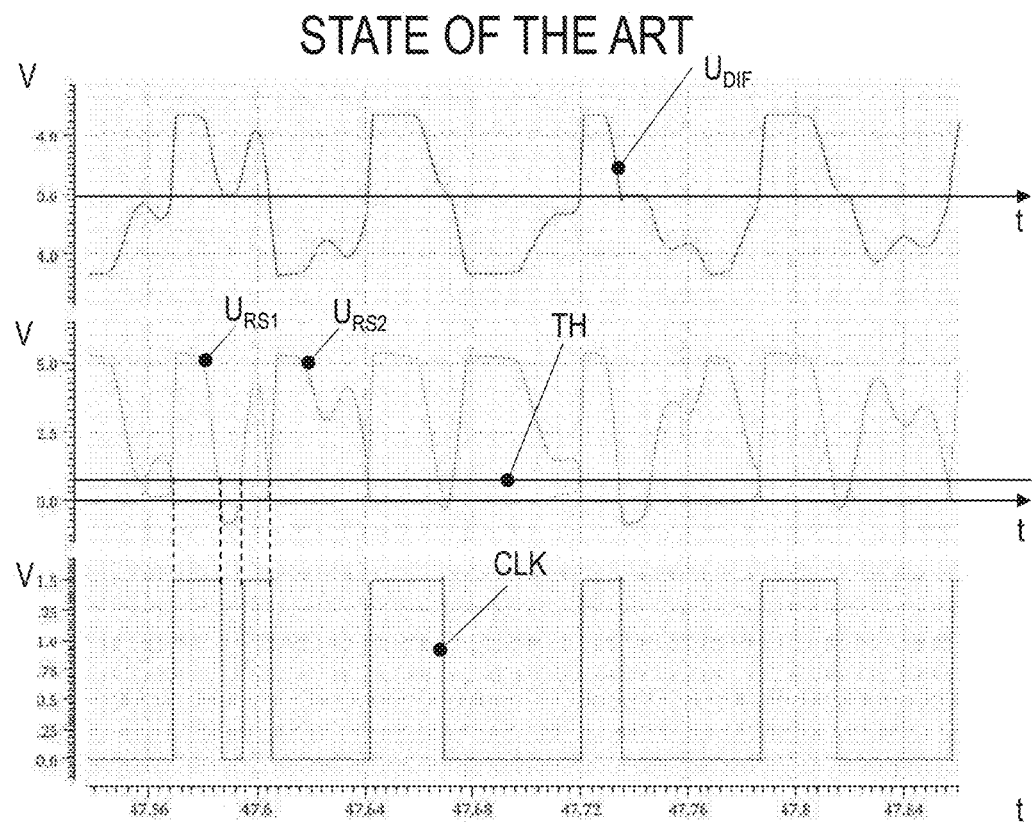
FIG. 3 shows distorted received signals and the bad quality internal clock signal extracted with the state of the art clock extraction stage of FIG. 1.
Figure 7:
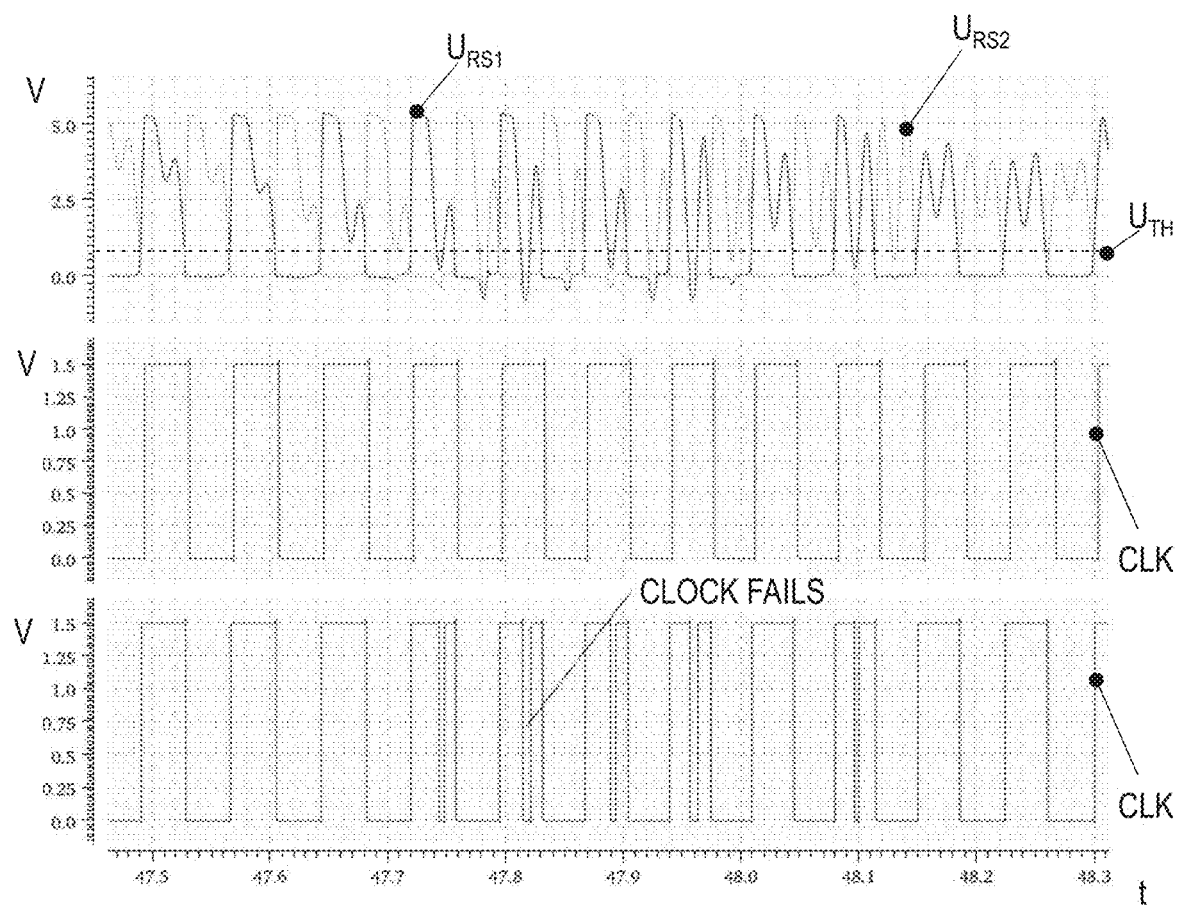
FIG. 7 shows signals of a second computer simulation of a comparison of the internal clock signal extracted by the state of the art the clock extraction circuit of FIG. 1 and by the inventive clock extraction circuit of FIG. 4.

FIG. 7 shows signals of a second computer simulation of a comparison of the internal clock signal CLK extracted by the state of the art clock extraction circuit 16 of FIG. 1 and the inventive clock extraction circuit 18 of FIG. 4. The upper time diagram of FIG. 7 shows the voltage $U_{RS1}$ of the first received signal RS1 and the voltage $U_{RS2}$ of the second received signal RS2, which signals are both distorted. The middle part of the time diagram of FIG. 7 shows the robust and correct internal clock signal CLK extracted by the inventive clock extraction circuit 18. The lower part of the time diagram of FIG. 7 shows the internal clock signal CLK extracted by the state of the art clock extraction circuit 16 with the only one threshold level $U_{TH}$ and with several clock fails.

It is furthermore advantageous that receiver 19 comprises a PLL stage 17 connected to the output of the clock extraction stage 18 to improve the quality of the internal clock signal CLK extracted by the inventive clock extraction circuit 18.

RF frequency area mentioned above has to be understood to cover kHz up to GHz frequency areas.

The invention claimed is:
1. A receiver configured to be exposed to a magnetic field with a specified carrier frequency and built to extract an internal clock signal for processing of data with a receiver IC of the receiver, which receiver comprises:
 an antenna built to receive an antenna signal and a tuning circuit and built to provide a first received signal at a first pin of the receiver IC and a second receiver signal at a second pin of the receiver IC, which receiver IC comprises:
  a harvesting stage built to rectify a differential received signal provided between the first pin and the second pin of the receiver IC and built to provide a supply voltage referenced to a ground potential for the receiver IC; and
  a clock extraction stage built to provide a first threshold level to switch the internal clock signal with a rectangular signal shape between high and low potential, wherein the clock extraction stage is built to provide a second threshold level and to provide a low threshold level, which is closer to ground potential than the first threshold level and the second threshold level, which clock extraction stage is built to switch the internal clock signal from low potential to high potential, if a voltage of the first received signal referenced to ground potential is above or passes above the first threshold level and a voltage of the second received signal referenced to ground potential is below or passes below the low threshold level and, which clock extraction stage is built to switch the internal clock signal from high potential to low potential, if the voltage of the first received signal referenced to ground potential is below or passes below the low threshold level and the voltage of the second received signal referenced to ground potential is above or passes above the second threshold level.

2. The receiver according to claim 1, wherein the receiver IC comprises a threshold adaption circuit built to adapt the first threshold level, if a peak voltage of the first received signal changes over time and/or built to adapt the second threshold level, if a peak voltage of the second received signal changes over time.

3. The receiver according to claim 2, wherein the threshold adaption circuit is built to increase a voltage of the first threshold level to a fixed first voltage below an actual peak voltage of the first received signal, if the actual peak voltage of the first received signal is higher than the actual voltage of the first threshold level plus the fixed first voltage and/or wherein the threshold adaption circuit is built to increase a voltage of the second threshold level a fixed second voltage below an actual peak voltage of the second received signal, if the actual peak voltage of the second received signal is higher than the actual voltage of the second threshold level plus the fixed second voltage.

4. The receiver according to claim 2, wherein the threshold adaption circuit is built to continuously reduce the voltage of the first threshold level and/or built to continuously reduce the voltage of the second threshold level based on a time constant.

5. The receiver according to claim 1, wherein the low threshold level is fixed and not adopted over time.

6. The receiver according to claim 2, wherein the clock extraction stage is realized with a first threshold inverter to observe the first threshold level, which first threshold inverter is connected with its input to the first pin of the receiver IC and with its supply to a voltage of the first threshold level referenced to ground potential and/or wherein the clock extraction stage is realized with a second threshold inverter to observe the second threshold level, which second threshold inverter is connected with its input to the second pin of the receiver IC and with its supply to a voltage of the second threshold level referenced to ground potential.

7. The receiver according to claim 1, wherein the receiver comprises a PLL stage connected to the output of the clock extraction stage.

8. The receiver according to claim 1, wherein the antenna and tuning circuit is built to receive the antenna signal with the carrier frequency of the system defined NFC resonance frequency of 13.56 MHz.

* * * * *